(12) United States Patent
Yan

(10) Patent No.: US 7,820,765 B2
(45) Date of Patent: Oct. 26, 2010

(54) AMINE FUNCTIONALIZED POLYMERS

(75) Inventor: Yuan-Yong Yan, Copley, OH (US)

(73) Assignee: Bridgestone Corporation (JP)

( * ) Notice: Subject to any disclaimer, the term of this patent is extended or adjusted under 35 U.S.C. 154(b) by 485 days.

(21) Appl. No.: 11/995,947

(22) PCT Filed: Jul. 19, 2006

(86) PCT No.: PCT/US2006/027880

§ 371 (c)(1),
(2), (4) Date: Jan. 17, 2008

(87) PCT Pub. No.: WO2007/015872

PCT Pub. Date: Feb. 8, 2007

(65) Prior Publication Data

US 2010/0120976 A1    May 13, 2010

Related U.S. Application Data

(60) Provisional application No. 60/701,384, filed on Jul. 20, 2005.

(51) Int. Cl.
C08C 19/22    (2006.01)

(52) U.S. Cl. ............ 525/374; 528/125; 528/129; 525/157; 525/123; 525/517; 525/495; 525/472; 525/329.6; 525/375; 525/376; 525/377; 525/380

(58) Field of Classification Search ........ 528/125, 528/129; 525/123, 157, 517, 495, 472, 329.6, 525/375, 377, 380
See application file for complete search history.

(56) References Cited

U.S. PATENT DOCUMENTS

| | | | |
|---|---|---|---|
| 2,515,318 A * | 7/1950 | Schoene | 526/257 |
| 2,959,574 A | 11/1960 | Woodberry | |
| 3,268,480 A | 8/1966 | Wagenaar et al. | |
| 3,795,991 A * | 3/1974 | Borjesson | 36/117.3 |
| 3,969,330 A * | 7/1976 | Lasis et al. | 525/288 |
| 4,529,772 A * | 7/1985 | Druschke et al. | 524/555 |
| 4,532,046 A | 7/1985 | Meunier et al. | |
| 4,536,296 A | 8/1985 | Vio | |
| 4,673,700 A * | 6/1987 | Ravichandran et al. | 524/96 |
| 4,767,540 A | 8/1988 | Spitzer et al. | |
| 4,810,296 A | 3/1989 | Guerro et al. | |
| 4,868,248 A | 9/1989 | Sparapany et al. | |
| 5,308,498 A | 5/1994 | Fong et al. | |
| 5,442,007 A * | 8/1995 | Parker et al. | 524/555 |
| 5,444,135 A * | 8/1995 | Cheradame et al. | 526/219.2 |
| 5,670,564 A * | 9/1997 | Gagne et al. | 524/99 |
| 6,075,092 A * | 6/2000 | Nakamura et al. | 525/122 |
| 6,172,138 B1 * | 1/2001 | Materne et al. | 523/212 |
| 6,262,183 B1 * | 7/2001 | Domb et al. | 525/329.4 |
| 6,552,132 B2 * | 4/2003 | Belt et al. | 525/338 |
| 6,596,809 B2 * | 7/2003 | Charmot et al. | 525/54.21 |
| 6,703,446 B2 | 3/2004 | Schwindeman et al. | |
| 6,759,464 B2 * | 7/2004 | Ajbani et al. | 524/445 |
| 6,851,462 B2 | 2/2005 | Frank et al. | |
| 6,977,281 B1 * | 12/2005 | Ozawa et al. | 525/377 |
| 7,125,934 B1 | 10/2006 | Parker | |
| 7,314,894 B2 | 1/2008 | Horiguchi et al. | |
| 2001/0023277 A1 * | 9/2001 | Belt et al. | 525/329.1 |
| 2002/0074696 A1 * | 6/2002 | Wu et al. | 264/446 |
| 2002/0103278 A1 * | 8/2002 | Krajnik et al. | 524/192 |
| 2003/0069332 A1 * | 4/2003 | Agostini et al. | 523/205 |
| 2003/0113660 A1 * | 6/2003 | Yoneda et al. | 430/270.1 |
| 2007/0078219 A1 * | 4/2007 | Zhao et al. | 525/54.1 |
| 2008/0103252 A1 | 5/2008 | Brumbaugh et al. | |
| 2008/0146745 A1 * | 6/2008 | Luo et al. | 525/342 |
| 2009/0111965 A1 * | 4/2009 | Lee | 528/229 |
| 2009/0171035 A1 * | 7/2009 | Luo et al. | 525/375 |
| 2010/0056780 A1 * | 3/2010 | Jeong et al. | 544/175 |
| 2010/0059160 A1 * | 3/2010 | Sandstrom | 152/525 |

OTHER PUBLICATIONS

STIC structure/database search report submitted May 19, 2010, 11995947-332035-EICSEARCH.pdf.*
Jager et al. Polymeric Marerials: Science & Engineering, 2001, 85, 546-547.*
L.V. Desai et al., "Palladium-catalyzed oxygenation of unactivated sp$^3$ C-H bonds," *J. Am. Chem. Soc.*, 2004, vol. 126, No. 31, pp. 9542-9543, (American Chem. Soc.; Washington, D.C.).
C.P. Jasperse et al., "Radical Reactions in Natural Product Synthesis," *Chem. Rev.*, 1991, vol. 91, No. 6, pp. 1237-1286, (American Chem. Soc.; Washington, D.C.).
M. Kitamura et al., "A Novel Method for the formation of C-N Bonds Using Oxime Derivatives," TCIMAIL, Aug. 2007, No. 126, pp. 2-13, (Tokyo Chemical Industry Co., Ltd.; Japan).
S.E. Booth et al., "Intramolecular Addtion of Vinyl and Aryl Radicals to Oxime Ethers in the Synthesis of Five-, Six- and Seven-membered Ring Systems," *J. Chem. Soc. Perkin Trans.*, 1994, pp. 3499-3508, (Royal Society of Chemistry; Great Britain).

* cited by examiner

*Primary Examiner*—Mark Eashoo
*Assistant Examiner*—Jane L Stanley
(74) *Attorney, Agent, or Firm*—Meredith E. Hooker; David Burleson

(57) ABSTRACT

A functionalized polymer includes a polymer chain and, bonded thereto, an functional group having the general formula —NHAR$^1$ where A is an oxygen atom, a sulfinyl (thionyl) group, a sulfonyl group, a quaternary phosphonium group, or a secondary amino group and where R$^1$ is a hydrogen atom or a moiety of the general formula —CH$_2$Z where Z is H or a substituted or unsubstituted aryl, alkyl, alkenyl, alkenaryl, aralkenyl, alkaryl, or aralkyl group. The material can be the reaction product of a living polymer and a compound that includes protected imine functionality. The functional group can interact with particulate filler such as, e.g., carbon black.

20 Claims, No Drawings

AMINE FUNCTIONALIZED POLYMERS

CROSS-REFERENCE TO RELATED APPLICATION

This application claims the benefit of U.S. provisional appl. No. 60/701,384, filed 20 Jul. 2005.

BACKGROUND INFORMATION

1. Field of the Invention

The invention relates to the manufacture and use of functionalized polymers that can interact with fillers.

2. Background of the Invention

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemical modifications to the terminal ends of the polymers.

Where an elastomer is made by anionic polymerization techniques, attachment of certain functional groups is difficult. Living polymers are terminated by active hydrogen atoms such as are present in, e.g., primary and secondary amine groups.

Because amine functional groups provide desirable interaction with particulate fillers, particularly carbon black, a commercially useful method of providing living polymers with terminal amine functionality remains highly desirable. Because the interactivity with fillers tends to increase as the number of hydrogens bonded to the amino nitrogen increases, the provision of secondary and primary amine-functionality is particularly desirable.

SUMMARY

In one aspect is provided a macromolecule that includes a polymer chain and, bonded thereto, a functional group having the general formula —$NHAR^1$ where A is an oxygen atom, a sulfinyl (thionyl) group, a sulfonyl group, a quaternary phosphonium group, or a secondary amino group and where $R^1$ is a hydrogen atom or a moiety of the general formula —$CH_2Z$ where Z is a hydrogen atom or a substituted or unsubstituted aryl, alkyl, alkenyl, alkenaryl, aralkenyl, alkaryl, or aralkyl group (with "substituted" meaning that the group contains a heteroatom or functionality that does not interfere with the intended purpose of the group).

In another aspect is provided a functional polymer including the reaction product of a living polymer and a compound that includes protected imine functionality.

In another aspect is provided a method for providing primary amine functionality to a macromolecule that includes a functional group having the general formula —$NHAR^1$ where A and $R^1$ are defined as above. In the method, a composition that includes the macromolecule is subjected to appropriate redox conditions so as to provide primary amine functionality from the functional group.

The functional group included in the just mentioned macromolecule and that is provided in the foregoing functionalized polymer can interact with particulate filler such as, e.g., carbon black. Compositions that include particulate fillers and the macromolecule or the functionalized polymer also are provided.

Other aspects of the present invention will be apparent to the ordinarily skilled artisan from the detailed description that follows.

DETAILED DESCRIPTION OF ILLUSTRATIVE EMBODIMENTS

To assist in understanding the following description of various embodiments of the invention, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"macromolecule" means a polymer that includes at least one group or substituent not originating or derived from its mer units;

"polyene" means a molecule with at least two double bonds located in the longest portion or chain thereof, and specifically is inclusive of dienes, trienes, and the like;

"terminus" means an end of a polymeric chain;

"terminal moiety" means a group or functionality located at a terminus;

"protected imine" means a compound of the general formula >C=NAR where A is defined as above and R is an atom or group that does not terminate (i.e., react directly with) a living polymer with common examples including, for example, alkyl groups, aryl groups, alkaryl groups, aralkyl groups, etc.;

"protected oxime" means a protected imine where A is an oxygen atom;

"oxyamine" means a moiety in which an oxygen atom is bonded directly to an amino nitrogen atom and to at least one other atom and is inclusive of hydroxylamines, alkoxyamines, and the like; and "hysteresis" means the difference between the energy applied to deform an article made from an elastomeric compound and the energy released as the article returns to its initial, non-deformed state.

The macromolecule includes a polymeric chain with at least one functional group having the general formula —NHAR$^1$ where A and R$^1$ are defined as above. The at least one functional group can constitute the "at least one group or substituent" in the foregoing definition of macromolecule.

The polymeric chain can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene. Homo- and interpolymers that include just polyene-derived mer units constitute one illustrative type of elastomer.

The polymeric chain also can include pendent aromatic groups such as can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from about 1 to about 50% by wt., from about 10 to about 45% by wt., or from about 20 to about 35% by wt., of the polymer chain; such interpolymers constitute one exemplary class of polymers. The microstructure of such interpolymers can be random, i.e., the mer units derived from each type of constituent monomer preferably do not form blocks and, instead, are incorporated in a non-repeating, essentially simultaneous manner. Random microstructure can provide particular benefit in certain end use applications such as, e.g., rubber compositions used in the manufacture of tire treads.

Exemplary elastomers include poly(butadiene), (poly)isoprene (either natural or synthesized), and interpolymers of butadiene and styrene such as, e.g., poly(styrene-co-butadiene) also known as SBR.

Polyenes can incorporate into polymeric chains in more than one way. Especially for tire tread applications, controlling this manner in which polyenes incorporate themselves into the polymer chain (i.e., the 1,2-microstructure of the polymer) can be desirable. A polymer chain with an overall 1,2-microstructure, based on total polyene content, of from about 10 to about 80%, optionally from about 25 to 65%, can be desirable for certain end use applications. For present purposes, a "substantially linear" polymer is one which has an overall 1,2-microstructure of no more than about 50%, preferably no more than about 45%, more preferably no more than about 40%, even more preferably no more than about 35%, and most preferably no more than about 30% based on total polyene content.

The number average molecular weight ($M_n$) of the polymer typically is such that a quenched sample exhibits a gum Mooney viscosity (ML$_4$/100° C.) of from about 2 to about 150, more commonly 2.5 to about 50.

Elastomers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Solution polymerization typically involves an initiator. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, the so-called functionalized initiators also are useful. These become incorporated into the polymer chain, thus providing a functional group at the initiated end of the chain. Examples of such materials include the reaction product of organolithium compounds and, for example, N-containing organic compounds (e.g., substituted aldimines, ketimines, secondary amines, etc.) optionally pre-reacted with a compound such as diisopropenyl benzene. A more detailed description of these materials can be found in, e.g., U.S. Pat. Nos. 5,153,159 and 5,567,815.

Useful anionic polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization of the mer units and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and the nature of the specific coordinator employed. Compounds useful as coordinators include organic compounds having a heteroatom with a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes such as 2,2'-di(tetrahydrofuryl)propane, di-piperidyl ethane, hexamethylphosphoramide, N,N'-dimethylpiperazine, diazabicyclooctane, diethyl ether, tributylamine, and the like. Details of linear and cyclic oligomeric oxolanyl coordinators can be found in, e.g., U.S. Pat. No. 4,429,091.

Although the ordinarily skilled artisan understands the type of conditions typically employed in solution polymerization, a representative description is provided for the convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to about 150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

Prior to being quenched, the polymer can be provided with a functional group of the general formula —NHAR$^1$ where A and R$^1$ are defined as above, such as for example an oxyamine group. Where R$^1$ is desired to be a hydrogen atom, the polymer first is provided with a group where R$^1$ is —CH$_2$Z (with Z defined as above) and then subjected to further reaction. One method of effecting this functionalization involves introducing to the polymer cement a compound that includes at least one protected imine.

Compounds containing imine groups are commercially available; nevertheless, for convenience of the reader, an overview of how such materials can be synthesized is provided using an oxime as representative of such imines. Specifically, an aldehyde or ketone can be reacted, often at room temperature, with a protected oxyamine (i.e., a compound containing an oxyamine group in which the oxygen atom is bonded to an R group as set forth above with respect to the definition of protected imine) such as, e.g., O-benzylhydroxylamine, methoxylamine, and the like, many of which commonly are available in their acid salt form. Potentially useful aldehydes and ketones have the general formula R$^2$C(O)R$^3$ where each of R$^2$ and R$^3$ independently is a hydrogen atom or a moiety of the general formula —CH$_2$Z where Z is defined as above, or R$^2$ and R$^3$ together form a cyclic structure optionally incorporating one or more heteroatoms such as, e.g., N, O, or S.

The foregoing reaction can result in a variety of protected imine structures. By way of non-limiting example, various combinations of the following R, R$^2$ and R$^3$ groups can provide useful protected imine-containing compounds:

R: $C_1$-$C_{12}$ alkyl groups such as, e.g., methyl, ethyl, propyl, isopropyl, t-butyl, and the like; alkaryl groups such as, e.g., methyl benzyl; $C_2$-$C_{12}$ unsaturated groups such as, e.g., cinnamyl and dodecenyl;

R$^2$ or R$^3$: H; $C_1$-$C_{12}$ alkyl groups as described above; aryl groups including those that include additional functionality bonded to the ring such as aminobenzyl, methyl benzyl, etc.; alkenaryl groups such as, e.g., cinnamyl, styryl, etc.; and alkaryl groups such as, e.g., methyl benzyl; and R$^2$ and R$^3$: together forming a substituted or unsubstituted cycloaliphatic, aromatic, or fused aromatic ring structure such as, e.g., cyclohexyl, benzyl, and the like.

Where R$^2$ and R$^3$ together form an aromatic structure, allowing the ring structure to be substituted (e.g., with a nitrogen atom) at a position ortho to the carbon atom that is bound to the carbonyl group can be desirable where certain performance characteristics are desired.

When a protected imine is added to a polymer cement containing living polymer (carbanion) chains, the imine carbon atom reacts at the anion, typically located at the end of the longest chain. (Where a multifunctional initiator is employed during polymerization, reaction with the foregoing types of compounds typically occurs on each terminus of the polymer.) Because of the reactivity of living polymers with imine functionality, reaction of the protected imine with the living polymer can be performed quickly (e.g., ~15-60 minutes) using relatively mild (e.g., ~25°-75° C. and atmospheric or slightly elevated pressures) anhydrous and anaerobic conditions. Mixing of a type commonly employed in commercial processes is sufficient to ensure near stoichiometric reaction between the living polymer and the compound(s) that provides a protected imine functional group.

At this point, the functionalized living polymer includes an anion of a protected imine group (—N$^-$AR) bonded to a polymer chain through an intermediate linking group having the general formula —CR$^2$R$^3$— with R, R$^2$, and R$^3$ being defined as above. The specific identity or nature of the R$^1$ group is determined during quenching of the functionalized living polymer.

Quenching can be conducted by stirring the polymer and an active hydrogen-containing compound (e.g., an alcohol or water) for up to about 120 minutes at temperatures of from about 30° to about 150° C. Where this type of quenching is performed, R$^1$ in the resulting functional group is R, i.e., no substitution or reaction occurs other than reduction of the amino anion.

Quenching also can be performed by introducing into the polymer cement a strong acid (e.g., HCl or the like) for up to about 120 minutes at temperatures of from about 25° to about 150° C.; if desired, a base thereafter can be added so as to neutralize any excess acid that might be present. This type of quenching results in alternative structures, depending on the identity of A. For example, where A is an oxygen atom, this type of quenching results in a group having the formula —NHOH, i.e., the protected oxime is hydrolyzed. Alternatively, where A is a sulfinyl, sulfonyl group, or quaternary phosphonium group, this type of quenching results in formation of a primary amine functional group, i.e., the greater electronegativity of the nitrogen atom relative to that of the sulfur or phosphorus atom results in cleavage of the N-A bond in the sulfinylimine, sulfonylimine, or phosphinoylimine functionality and creation of a leaving group.

Alternatively, in the situation where the (anionic) protected imine functional group is an oxime and primary amine functionality is desirable, quenching can be performed by introducing into the polymer cement a reducing agent such as, e.g., a solution of Li(AlH$_4$).

Regardless of which quenching process is utilized, the resulting functional group can exhibit excellent interactivity with particulate fillers, particularly carbon black.

Solvent can be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

The functionalized polymer can be utilized in a tread stock compound or can be blended with any conventionally employed tread stock rubber including natural rubber and/or non-functionalized synthetic rubbers such as, e.g., one or more of poly(isoprene), SBR, poly(butadiene), butyl rubber, neoprene, ethylene/propylene rubber (EPR), ethylene/propylene/diene rubber (EPDM), acrylonitrile/butadiene rubber (NBR), silicone rubber, fluoroelastomers, ethylene/acrylic rubber, ethylene/vinyl acetate interpolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% by wt. of the total rubber, with the conventional rubber(s) making up the balance of the total rubber. The minimum amount depends to a significant extent on the degree of hysteresis reduction desired.

Amorphous silica (SiO$_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface are include from about 32 to about 400 $m^2/g$, about 100 to about 250 $m^2/g$, and about 150 to about 220 $m^2/g$.

The pH of the silica filler is generally from about 5 to about 7 or slightly over, preferably from about 5.5 to about 6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of about 1 to about 100 parts by weight (pbw) per 100 parts of polymer (phr), preferably in an amount from about 5 to about 80 phr. The useful upper range is limited by the high viscosity imparted by fillers of this type.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; surface area values can be determined by ASTM D-1765 using the cetyltrimethyl-ammonium bromide (CTAB) technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical. When carbon black is used with silica, the amount of silica can be decreased to as low as about 1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of about 25%; accordingly, typical (combined) amounts of reinforcing fillers, i.e., silica and carbon black, is about 30 to 100 phr.

When silica is employed as a reinforcing filler, addition of a coupling agent such as a silane is customary so as to ensure good mixing in, and interaction with, the elastomer(s). Generally, the amount of silane that is added ranges between about 4 and 20% by weight, based upon the weight of silica filler present in the elastomeric compound.

Coupling agents can have a general formula of Q-T-X, in which Q represents a functional group capable of bonding physically and/or chemically with a group on the surface of the silica filler (e.g., surface silanol groups); T represents a hydrocarbon group linkage; and X represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the X and Q functionalities mentioned above. One preferred coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful, as set forth below. The additional fillers can be utilized in an amount of up to about 40 phr, preferably up to about 20 phr.

Other conventional rubber additives also can be added. These include, for example, process oils, plasticizers, anti-degradants such as antioxidants and antiozonants, curing agents and the like.

All of the ingredients can be mixed using standard equipment such as, e.g., Banbury or Brabender mixers. Typically, the initial mixing (i.e., that which is not intended to immediately precede vulcanization) occurs at a temperature between about 140° and 160° C., often between about 145° and 155° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Sulfur curing typically occurs at about 170° C. and, accordingly, curing components typically are mixed at a temperature that is ~10° to ~20° C. higher than that employed in the initial mixing discussed above.

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations. Butadiene (21.4% by wt. in hexane), styrene (33% by wt. in hexane), hexane, n-butyllithium (1.6 M in hexane), oligomeric oxolanyl propanes (1.6 M solution in hexane, stored over $CaH_2$), and butylated hydroxytoluene (BHT) solution in hexane were used.

Commercially available reagents and starting materials included the following, all of which were acquired from Sigma-Aldrich Co. (St. Louis, Mo.) and used without further purification unless otherwise noted: O-benzylhydroxylamine hydrochloride (99% purity), methoxyl amine hydrochloride (98% purity), formaldehyde (37 wt. % in water), DMF (99.9% purity), 1,3-dimethyl-2-imidazolidinone (99.5% purity), 4-(dimethylamino)benzaldehyde (99% purity), 4-(diethylamino)benzaldehyde (97% purity), trans-cinnamaldehyde (98% purity), 4-(dimethylamino)cinnamaldehyde (98% purity), 2-pyridinecarboxaldehyde (99% purity), 3-pyridinecarboxaldehyde (98% purity), 4-pyridinecarboxaldehyde (97% purity), 2-thiophenecarboxaldehyde (98% purity), N-methyl-2-pyrrolecarboxaldehyde (98% purity), and $(CH_3)_4NOH$ (1.0 M aqueous solution).

Testing data in the Examples was performed on filled compositions made according to the formulation shown in Table 1. In these tables, N-phenyl-N'-(1,3-dimethylbutyl)-p-phenyldiamine acts as an antioxidant while benzothiazyl-2-cyclohexylsulfonamide and N,N'-diphenyl guanidine act as accelerators.

TABLE 1

Compound formulation, carbon black only

|  | Amount (phr) |
|---|---|
| Masterbatch | |
| Polymer | 100 |
| carbon black (N343 type) | 55 |
| Wax | 1 |
| N-phenyl-N'-(1,3-dimethylbutyl)-p-phenyldiamine | 0.95 |
| ZnO | 2.5 |
| stearic acid | 2 |
| aromatic processing oil | 10 |
| Final | |
| Sulfur | 1.3 |
| benzothiazyl-2-cyclohexylsulfenamide | 1.7 |
| N,N'-diphenyl guanidine | 0.2 |
| TOTAL | 174.65 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Bound Rubber" were determined using the procedure described by J. J. Brennan et al., *Rubber Chem. and Tech.*, 40, 817 (1967).

Examples 1-4

To a $N_2$-purged reactor equipped with a stirrer was added 1.53 kg hexane, 0.41 kg styrene solution, and 2.54 kg butadiene solution. The reactor was charged with 3.88 mL n-butyllithium in hexane, followed by 1.30 mL OOPS (in hexane). The reactor jacket was heated to 50° C. and, after ~28 minutes, the batch temperature peaked at ~63° C. After an additional 25 minutes, the polymer cement was transferred from the reactor to dried glass vessels.

Three samples were reacted in a 50° C. bath for ~30 minutes with, respectively, 1.0 M (in hexane) solutions of
sample 2: formaldehyde O-benzyloxime,
sample 3: 1,3-dimethyl-2-imidazolidinone O-benzyloxime, and
sample 4: trans-cinnamaldehyde O-benzyloxime,
which were prepared by reacting O-benzylhydroxylamine with, respectively, formaldehyde, 1,3-dimethyl-2-imidazolidinone, and trans-cinnamaldehyde. These and a non-functionalized polymer (sample 1) were coagulated in isopropanol containing BHT and drum dried.

Using the formulation shown in Table 1, vulcanizable elastomeric compounds containing reinforcing fillers were prepared from samples 1-4. Results of physical testing on these compounds are shown below in Table 2.

TABLE 2

Testing data from Examples 1-4

|  | 1 | 2 | 3 | 4 |
|---|---|---|---|---|
| $M_n$ (kg/mol) | 105 | 125 | 103 | 141 |
| $M_w/M_n$ | 1.06 | 1.18 | 1.04 | 1.31 |
| % coupling | 2.7 | 30.5 | 0* | 45.8 |
| $T_g$ (° C.) | −35.4 | −36.1 | −35.6 | −35.6 |
| Bound rubber (%) | 6.1 | 28.6 | 30.2 | 28.0 |
| 171° C. MDR $t_{50}$ (min) | 3.30 | 2.97 | 2.88 | 2.95 |
| 171° C. MH-ML (kg-cm) | 17.4 | 18.8 | 18.2 | 17.1 |
| $ML_{1+4}$ @ 130° C. | 20.7 | 38.2 | 32.7 | 40.5 |
| 300% modulus @ 23° C. (MPa) | 9.65 | 13.55 | 13.63 | 12.34 |
| Tensile strength @ 23° C. (MPa) | 16.25 | 17.31 | 17.29 | 19.22 |
| Temp. sweep 0° C. tan δ | 0.218 | 0.248 | 0.239 | 0.240 |
| Temp. sweep 50° C. tan δ | 0.262 | 0.213 | 0.217 | 0.263 |
| RDA 0.25-14% ΔG' (MPa) | 4.741 | 1.610 | 1.229 | 1.757 |
| 50° C. RDA strain sweep (5% strain) tan δ | 0.2637 | 0.1609 | 0.1430 | 0.1802 |
| 50° C. Dynastat tan δ | 0.2492 | 0.1540 | 0.1474 | 0.1707 |

*No coupling as measured by GPC

From the 50° C. strain sweep data of Table 2, one can see that a styrene/butadiene interpolymer having a terminal aryloxyamine functional group (Examples 2 and 3) can provide, compared to a control polymer, at least a 38% reduction in tan δ when used in a carbon black-filled formulation.

From the tan δ at 0° C. data in Table 2, one can see that the same functionalized polymers provide higher values, corresponding generally to better wet traction, than a control polymer.

From the RDA data in Table 2, one can see that each of Examples 2-4 provides significant reduction in ΔG' relative to a control (Example 1). This reduction correlates with a lessening of the Payne effect, i.e., a decrease in the storage modulus of filled rubbery polymers with an increase in the amplitude of small-strain oscillations in dynamic mechanical tests, commonly believed to be due to aggregation of filler particles into clusters and networks. This would seem to indicate significantly better polymer-filler interaction for the functionalized polymers of Examples 2-4 than the control polymer of Example 1.

Examples 5-9

The procedure described with respect to Examples 1-4 was, in substantial part, repeated. Sample 5 (control) was terminated with isopropanol while two others were reacted with, respectively, 1.0 M (in hexane) solutions of sample 6: 4-(dimethylamino)benzaldehyde O-methyloxime, and sample 8: 4-(diethylamino)benzaldehyde O-methyloxime, which were prepared by reacting methoxyl amine with, respectively, 4-(dimethylamino)benzaldehyde and 4-(diethylamino)benzaldehyde. Samples 7 and 9 were prepared from, respectively, samples 6 and 8 by acid hydrolysis (1% HCl in THF/hexane solution) followed by neutralization (using $(CH_3)_4NOH$); each of samples 7 and 9 thus included a hydroxylamine moiety as part of the terminal functional group.

Using the formulation shown in Tables 1 above, vulcanizable elastomeric compounds containing reinforcing fillers were prepared from samples 5-9. Results of physical testing on these compounds are shown below in Table 3.

TABLE 3

Testing data from Examples 5-9

|  | 5 | 6 | 7 | 8 | 9 |
|---|---|---|---|---|---|
| $M_n$ (kg/mol) | 104 | 129 | 149 | 143 | 149 |
| $M_w/M_n$ | 1.04 | 1.15 | 1.22 | 1.15 | 1.14 |
| % coupling | 0.6 | 39.0 | 57.4 | 56.4 | 61.4 |
| $T_g$ (° C.) | −37.1 | −36.6 | −37.9 | −37.5 | −37.6 |
| Bound rubber (%) | 8.0 | 24.3 | 31.7 | 24.9 | 27.8 |
| 171° C. MDR $t_{50}$ (min) | 3.37 | 2.87 | 1.75 | 2.91 | 1.72 |
| 171° C. MH-ML (kg-cm) | 17.8 | 17.3 | 19.2 | 18.7 | 20.4 |
| $ML_{1+4}$ @ 130° C. | 23.2 | 41.2 | 60.7 | 52.9 | 60.1 |
| 300% modulus @ 23° C. (MPa) | 9.73 | 11.96 | 15.23 | 13.40 | 16.02 |
| Tensile strength @ 23° C. (MPa) | 14.68 | 17.46 | 17.54 | 18.20 | 19.55 |
| Temp. sweep 0° C. tan δ | 0.207 | 0.221 | 0.251 | 0.214 | 0.233 |
| Temp. sweep 50° C. tan δ | 0.266 | 0.238 | 0.172 | 0.225 | 0.207 |
| RDA 0.25-14% ΔG' (MPa) | 5.189 | 2.048 | 1.212 | 2.450 | 1.728 |
| 50° C. RDA strain sweep (5% strain) tan δ | 0.2643 | 0.1830 | 0.1259 | 0.1916 | 0.1466 |
| 50° C. Dynastat tan δ | 0.2552 | 0.1777 | 0.1338 | 0.1758 | 0.1517 |

From the 50° C. strain sweep data of Table 3, one can see that styrene/butadiene interpolymers having terminal aryloxyamine functional groups (Examples 6 and 8) again provide, compared to a control polymer, at least a 30% reduction in tan δ when used in a carbon black-filled formulation, while styrene/butadiene interpolymers having a terminal hydroxylamine functional group (Examples 7 and 9) can provide, compared to a control polymer, ~40-50% reduction in tan δ.

Similar to the results seen in Table 2, the RDA data from Table 3 indicate that each of Examples 6-9 provides significant reduction in ΔG' relative to a control (Example 5), i.e., a probable lessening of the Payne effect.

Examples 10-13

The procedure described with respect to Examples 1-4 was, in substantial part, repeated. Sample 10 (control) was terminated with isopropanol, sample 11 (comparative) was reacted with 1,3-dimethyl-2-imidazolidinone (DMI), and another sample was reacted with 2-pyridinecarboxaldehyde-O-methyloxime (formed through the reaction of 2-pyridinecarboxaldehyde and methoxyl amine). One portion of the latter was terminated with isopropanol so as to form a methoxylamine-functionalized polymer (sample 12), and another portion was acid hydrolyzed and then neutralized with $NH_4OH$ so as to form a hydroxylamine-functionalized polymer (sample 13).

Using the formulation shown in Table 1 above, vulcanizable elastomeric compounds containing reinforcing fillers were prepared from samples 10-13. Results of physical testing on these compounds are shown below in Table 4.

TABLE 4

Testing data from Examples 10-13

| | 10 | 11 | 12 | 13 |
|---|---|---|---|---|
| $M_n$ (kg/mol) | 112 | 79[a] | 121 | 132 |
| $M_w/M_n$ | 1.04 | 1.10 | 1.14 | 1.24 |
| % coupling | 2.4 | 0[b] | 18.1 | 27.3 |
| $T_g$ (° C.) | −37.6 | −37.8 | −37.7 | −37.8 |
| Bound rubber (%) | 11.2 | 34.0 | 32.2 | 32.2 |
| 171° C. MDR $t_{50}$ (min) | 3.03 | 1.92 | 2.70 | 2.95 |
| 171° C. MH-ML (kg-cm) | 19.0 | 17.3 | 17.6 | 17.5 |
| $ML_{1+4}$ @ 130° C. | 25.1 | 41.0 | 41.7 | 45.7 |
| 300% modulus @ 23° C. (MPa) | 11.23 | 14.37 | 14.06 | 13.66 |
| Tensile strength @ 23° C. (MPa) | 15.84 | 20.11 | 19.70 | 18.59 |
| Temp. sweep 0° C. tan δ | 0.196 | 0.244 | 0.225 | 0.228 |
| Temp. sweep 50° C. tan δ | 0.261 | 0.196 | 0.179 | 0.181 |
| RDA 0.25-14% ΔG' (MPa) | 4.485 | 0.672 | 0.713 | 0.771 |
| 50° C. RDA strain sweep (5% strain) tan δ | 0.2433 | 0.1126 | 0.1108 | 0.1163 |
| 50° C. Dynastat tan δ | 0.2292 | 0.1041 | 0.1105 | 0.1096 |

[a] DMI-functionalized polymers typically show molecular weights lower than those of control polymers from which they are made due to interaction by the DMI functionality with GPC adsorbents.
[b] Could not be measured.

The data of Table 4 show that Examples 12-13, which are compositions that include polymers that have been functionalized through reaction with 2-pyridinecarboxaldehyde-O-methyloxime, exhibit an excellent combination of physical properties. The 50° C. strain sweep, bound rubber, modulus, tensile strength, ΔG', etc., data are comparable to or better than those of comparative Example 11 (DMI-functionalized polymer) and significantly better than those of control Example 10.

Additionally, because Examples 12-13 exhibit significant coupling, they are anticipated to process much more easily than DMI-functionalized polymers, which have notoriously poor cold flow properties.

The invention claimed is:

1. A macromolecule comprising a polymer chain that comprises polyene mer and, bonded to a terminus of said polymer chain, a functional group having the general formula

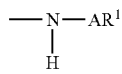

wherein

A is an oxygen atom, a sulfonyl group, a sulfonyl group, a quaternary phosphonium group, or a secondary amino group, and $R^1$ is a hydrogen atom or —$CH_2Z$ where Z is a hydrogen atom or a substituted or unsubstituted aryl, alkyl, alkenyl, alkenaryl, aralkenyl, alkaryl, or aralkyl group.

2. The macromolecule of claim 1 wherein said polymer chain is substantially linear.

3. The macromolecule of claim 1 wherein said functional group is bonded to said polymer chain through an intermediate linking group having the general formula —$CR^2R^3$— wherein each of $R^2$ and $R^3$ independently is H or —$CH_2Z$ where Z is H or a substituted or unsubstituted aryl, alkyl, alkenyl, alkenaryl, aralkenyl, alkaryl, or aralkyl group or, together $R^2$ and $R^3$ form a cycloaliphatic, aromatic, heteroaromatic, or fused aromatic ring, said ring optionally being substituted.

4. The macromolecule of claim 3 wherein at least one of $R^2$ and $R^3$ is an aromatic group, said aromatic group optionally comprising additional functionality bonded to a ring atom of said aromatic group.

5. The macromolecule of claim 3 wherein $R^2$ and $R^3$ together form an aromatic group that comprises a heteroatom at a position ortho to the carbon atom of said intermediate linking group.

6. The macromolecule of claim 5 wherein said heteroatom is a nitrogen atom.

7. A method for providing primary amine functionality to a macromolecule that comprises a functional group having the general formula —$NHAR^1$ wherein A is an oxygen atom, a sulfinyl group, a sulfonyl group, a quaternary phosphonium group, or a secondary amino group and $R^1$ is a hydrogen atom or —$CH_2Z$ where Z is a hydrogen atom or a substituted or unsubstituted aryl, alkyl, alkenyl, alkenaryl, aralkenyl, alkaryl, or aralkyl group, said method comprising subjecting a composition comprising said macromolecule to appropriate redox conditions so as to provide said primary amine functionality from said functional group.

8. The method of claim 7 wherein A is an oxygen atom and wherein said redox conditions involve introducing a reducing agent to said composition.

9. The method of claim 7 wherein A is a sulfinyl group, a sulfonyl group, a quaternary phosphonium group, or a secondary amino group and wherein said redox conditions involve introducing an acid to said composition.

10. The method of claim 9 further comprising neutralizing said composition by adding a base thereto.

11. A composition comprising at least one type of particulate filler and a macromolecule that comprises a polymer chain that comprises polyene mer and, bonded to a terminus of said polymer chain, a functional group having the general formula

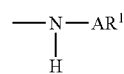

wherein
- A is an oxygen atom, a sulfinyl group, a sulfonyl group, a quaternary phosphonium group, or a secondary amino group, and
- $R^1$ is a hydrogen atom or —$CH_2Z$ where Z is a hydrogen atom or a substituted or unsubstituted aryl, alkyl, alkenyl, alkenaryl, aralkenyl, alkaryl, or aralkyl group.

12. The composition of claim 11 wherein said at least one type of particulate filler comprises carbon black.

13. The composition of claim 11 wherein said polymer chain of said macromolecule is substantially linear.

14. The composition of claim 11 wherein said functional group is bonded to said polymer chain through an intermediate linking group having the general formula —$CR^2R^3$— wherein each of $R^2$ and $R^3$ independently is H or —$C_{1-12}Z$ where Z is H or a substituted or unsubstituted aryl, alkyl, alkenyl, alkenaryl, aralkenyl, alkaryl, or aralkyl group or, together $R^2$ and $R^3$ form a cycloaliphatic, aromatic, heteroaromatic, or fused aromatic ring, said ring optionally being substituted.

15. The composition of claim 14 wherein at least one of $R^2$ and $R^3$ is an aromatic group, said aromatic group optionally comprising additional functionality bonded to a ring atom of said aromatic group.

16. The composition of claim 14 wherein $R^2$ and $R^3$ together form an aromatic group that comprises a heteroatom at a position ortho to the carbon atom of said intermediate linking group.

17. The composition of claim 16 wherein said heteroatom is a nitrogen atom.

18. The composition of claim 17 wherein said at least one type of particulate filler comprises carbon black.

19. The composition of claim 11 wherein said macromolecule is the reaction product of a living polymer and a compound that comprises protected imine functionality.

20. The composition of claim 19 wherein said at least one type of particulate filler comprises carbon black.

* * * * *